(No Model.)
D. H. RICE.
FRUIT SQUEEZER.
No. 413,244. Patented Oct. 22, 1889.
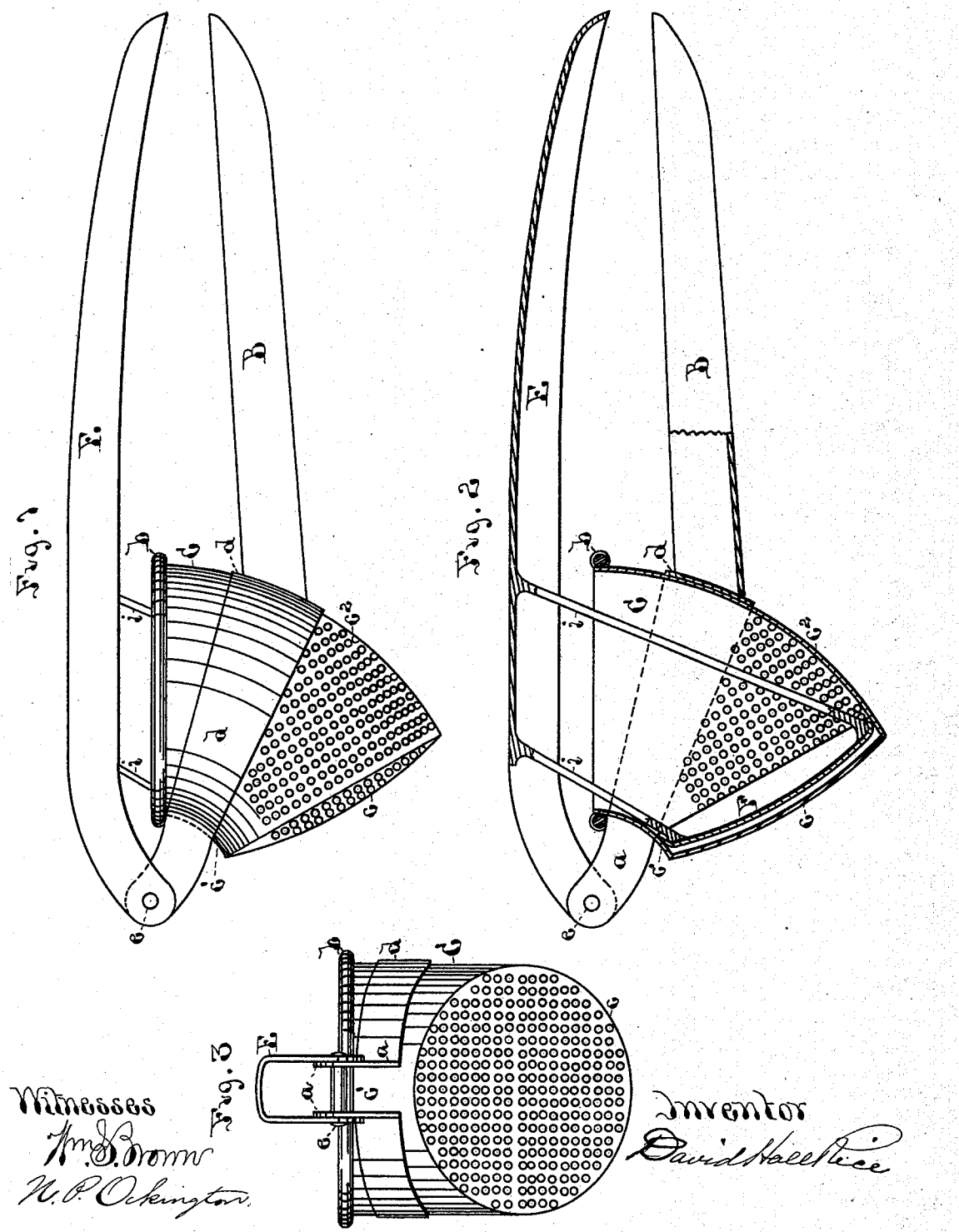

UNITED STATES PATENT OFFICE.

DAVID HALL RICE, OF BROOKLINE, MASSACHUSETTS.

FRUIT-SQUEEZER.

SPECIFICATION forming part of Letters Patent No. 413,244, dated October 22, 1889.

Application filed June 3, 1889. Serial No. 312,974. (No model.)

*To all whom it may concern:*

Be it known that I, DAVID HALL RICE, of Brookline, in the county of Norfolk and State of Massachusetts, have invented a new and useful Improvement in Press and Strainer, of which the following is a specification.

My invention relates to a press and strainer for pressing fruit and vegetables; and it consists in certain improved constructions and combinations of the several parts thereof, substantially as hereinafter described and claimed.

My invention is an improvement upon the press shown in the patent of Frederick for a potato-masher, No. 112,577, March 14, 1871, and the patent of Littlefield, No. 78,981, January 16, 1868, and the British patent of Smith, No. 10,374 of 1844. In these patents a tin cylinder or cup is shown and described, having numerous fine perforations in the bottom and sides, through which the softer parts of the vegetables or fruit are to be expressed, leaving the skin and seeds in the cup. The expressing of the vegetables is performed by a plunger attached to a handle, which is in turn pivoted to a frame surrounding the cup, the plunger fitting the cylindrical cup closely and descending therein to press upon the vegetables, and in the Littlefield patent one or more arms project from the frame on the opposite side from the handle-pivot, which may be employed as handles to hold the same by. In the Smith patent the cylindrical part of the cup is also slightly curved to enable the plunger to have a closer fit when descending into it. In this patent it is necessary to place the hinge of the handle at some distance away from the cup to allow the plunger to have the proper fit, and in the Littlefield patent, in order to bring the hinge of the handle nearer to the cup, the plunger is pivotally connected to the handle.

My improvement consists in making one side of the cup shorter than the other, while preserving all the features of the presses above described, and in locating the frame around the middle part of the cup, where it will serve to support the strain in the best manner, and by this means I am enabled to bring the pivot of the handle nearer to the cup and get a more powerful compression upon the vegetables to be mashed, while using the plunger fixed to the handle like that of Smith.

In the drawings, Figure 1 is a side elevation of a press constructed according to my invention. Fig. 2 is a vertical longitudinal section of the same. Fig. 3 is an end view of Fig. 1, looking against the bottom end of the cup.

C is the cylindrical cup or dish, made of tin and perforated with fine holes in its sides and lower end $c$, as described by Littlefield and Smith. This cup is bent into a curved form, and has the side $c'$ made much shorter than the side $c^2$ of its cylinder, the curves of the two sides being concentric with each other. The upper end of the cup is stiffened, like that of Littlefield, by a wire, over which its thin metal is rolled or turned, forming a bead $b$ around its upper edge. Around the middle part of the cup above its perforations a frame or band $d$ is secured. I place this band in this position, instead of at the top of the cup, as shown by Smith, or its bottom, as shown by Littlefield, because experience has shown that when the side $c^2$ of the cup is made so much longer than the side $c'$ the band located in this position affords better support to prevent the cup being strained or drawn out of shape under the compression of the plunger in the cup. The sides of the cup within and above this band $d$ do not need to be perforated, as they are useful to allow the preliminary compression of the vegetables into a single body before the latter begin to be expressed through the perforations.

On the side of the band $d$ adjacent to the short concave side $c'$ of the cup and outside of the latter I attach ears $a\ a$, and to these I pivot the handle E by the pivot $e$. On the handle E, I attach the platen or follower F by arms $i\ i$ in such a position that it will traverse the cup and come down against its bottom $c$ when the handle is pressed clear down, in the same way as the platen of the Littlefield press, the follower being made round and fitting the cylindrical part of the cup like his. On the opposite side of the band $d$ from the pivot $e$, I attach an arm B, in the same relative position as the like part of the Littlefield press; but I form it into a better shape to serve as a handle. It will be observed that by using a cup with the concentrically-curved walls $c'$ $c^2$, and making one shorter than the other, corresponding to the less distance traversed by the handle E opposite its edge, I am enabled to bring the pivot $e$ close up to the shorter side $c'$ of the cup and allow the follower F to traverse past that side and the opposite one $c^2$, just as it does in the Littlefield press, and move clear up against the bottom $c$ of the press, as his does, and at the same time fix the follower to the handle rigidly, like the press of Smith. This would be impossible if the sides $c'$ $c^2$ of the cup were of the same length, substantially, without reducing the side $c^2$ so as to impair the capacity of the cup.

I am aware that presses have been made in which the platen or follower (corresponding to F) was hinged to one side of the frame of the cup and a handle attached thereto; but these differ from my press in having the hinge of the follower located within or at the upper edge of the cup, where the expressed vegetables can come in contact with and to a certain extent pass behind the hinge, whereas my press, by keeping the more ancient hinge of the handle, which was entirely outside of the cup, and not hinging the follower to its pivot at all, but mounting it entirely upon the handle, effectually prevents any vegetable substance from coming in contact with the hinge.

What I claim as new and of my invention is—

1. The combination, in a press, of the perforated cup C, having its opposite sides $c'$ $c^2$ in substantially parallel curves, the concave side $c'$ being shorter than its convex side $c^2$, with the handle E, pivoted outside on the shorter side $c'$ and carrying the follower F, attached thereto in position to pass down into and fit said cup, substantially as described.

2. The combination, in a press, of the perforated cup C, having its opposite sides $c'$ $c^2$ in substantially parallel curves, the concave side $c'$ being shorter than the convex side $c^2$, the band $d$, secured circumferentially around said cup between its mouth and its lower end, the handle E, pivoted to one side of said band opposite the side $c'$ of said cup and carrying the follower F in position to enter into and fit said cup, and the handle B, attached to the opposite side of said band and opposite to the handle E, substantially as described.

DAVID HALL RICE.

Witnesses:
WILLIAM P. BLAKE,
N. P. OCKINGTON.